United States Patent [19]

Doi

[11] Patent Number: 5,052,662
[45] Date of Patent: Oct. 1, 1991

[54] MOUNTING ARRANGEMENT FOR AUTOMOTIVE ENGINE

[75] Inventor: Kazuhiro Doi, Yokohama, Japan

[73] Assignee: Nissan Motor Co., Ltd., Yokohama, Japan

[21] Appl. No.: 410,061

[22] Filed: Sep. 21, 1989

[30] Foreign Application Priority Data

Sep. 26, 1988 [JP] Japan ............................ 63-125501[U]

[51] Int. Cl.$^5$ ............................................ F16F 13/00
[52] U.S. Cl. ................................ 267/140.1; 180/312; 248/562; 248/636
[58] Field of Search ............... 267/140.1 E, 140.1 AE, 267/140.1 R; 180/300, 312, 902; 248/562, 636

[56] References Cited

U.S. PATENT DOCUMENTS

| | | | |
|---|---|---|---|
| 4,706,945 | 11/1987 | Watanabe et al. | 267/140.1 AE X |
| 4,720,087 | 1/1988 | Duclos et al. | 267/140.1 AE |
| 4,861,006 | 8/1989 | Takano et al. | 267/140.1 AE |
| 4,893,797 | 1/1990 | Fol et al. | 267/140.1 A |

FOREIGN PATENT DOCUMENTS

| | | | |
|---|---|---|---|
| 3638944 | 6/1987 | Fed. Rep. of Germany | 267/140.1 AE |
| 3611529 | 10/1987 | Fed. Rep. of Germany | 180/300 |
| 151644 | 8/1984 | Japan | 267/140.1 A |
| 60-104828 | 6/1985 | Japan | |
| 270843 | 11/1987 | Japan | 267/140.1 AE |
| 120931 | 5/1988 | Japan | 180/312 |
| 203940 | 8/1988 | Japan | 248/562 |

*Primary Examiner*—George E. A. Halvosa
*Attorney, Agent, or Firm*—Foley & Lardner

[57] ABSTRACT

An ERF (electrorheopectic fluid) filled engine mount has a main working chamber and first and second auxiliary chambers. An orifice passage structure provides fluid communication between the main and first auxiliary chambers. A first set of electrode plates are disposed in the orifice passage structure in a manner which permits the viscosity of the ERF to be selectively controlled. The first auxiliary chamber exhibits a relatively small expansive spring characteristic. A transfer port provides fluid communication between the main working chamber and the second auxiliary chamber. The second auxiliary chamber exhibits a relatively large expansive spring characteristic and functions to attenuate relatively high frequency vibration. An on/off type valve device is disposed in the transfer port.

1 Claim, 3 Drawing Sheets

MOUNTING ARRANGEMENT FOR AUTOMOTIVE ENGINE

BACKGROUND OF THE INVENTION

1. Field of the Invention

The present invention relates generally to damping devices of the nature used to support vibrating bodies, and more specifically to a damping device which is particularly suited to automotive applications and which features an arrangement which improves the attenuation of vibrations having a frequency which tends to produce reverberation noise in the vehicle cabin.

2. Description of the Prior Art

JP-A-60-104828 describes an example of a damping type unit which takes the form of a hollow elastomeric bushing member which is filled with an electrorheogical fluid (or ERF as it will be referred to hereinafter) and which is further provided with an electrically controlled orifice unit which divides the device into a working chamber and an expansion chamber. With this device, when the bushing is compressed, fluid is displaced from the working chamber into the auxiliary one (defined between the orifice unit and a relatively flexible diaphragm) and vice versa. By applying a high voltage across the electrodes of the orifice, the viscosity of the ERF undergoes a remarkable increase and the fluid assumes an almost solid state. Under these conditions the orifice is either effectively blocked (induced to undergo so called stick) or the restrictive properties thereof remarkably increased.

When this type of arrangement is used to support automotive engines, for example, it is possible to improve the effective vibration damping characteristics of the system defined by the engine, mounts and vehicle chassis, particularly at low frequencies. For example, when the engine is idling or undergoes what shall be referred to as engine shake, the vibrations produced exhibit low frequency, large amplitude characteristics.

However, this type of arrangement has suffered from the drawback that even though the above vibration attenuation tends to be very effective in the vibration frequency range in which idle and shake and vibration occur, the device has proven somewhat ineffective in that the spring constant of the device tends to be raised excessively in the vibration frequency range in which reverberation noise is produced in the vehicle cabin.

In this specification it will be assumed for the sake of discussion that the engine "shake" vibrations exhibit a frequency in the order of 10 Hz while the engine "idling" vibrations exhibit a frequency in the order of 25 Hz. On the other hand, the vibrational range in which the reverberation tends to occur lies in the 80–100 Hz region.

More specifically, with the above type of engine mount, in order to attenuate low frequency vibrations which tend to be transmitted between the engine and the vehicle chassis during engine idling and engine shake modes, it is necessary that the dynamic spring constant be set to a low value.

On the other hand, in the vibration frequency range wherein road vibration induces the power unit to resonate, the large amplitude vibration which the engine undergoes (engine shake) makes it necessary to provide the device with a large loss factor in order to control the relatively large displacement of the power unit.

In this connection the above mentioned prior art engine mount arrangement has made use of the "electrode orifice" arrangement which enables the viscosity of the ERF in the orifice passage structure to be controlled in a manner which achieves both of the above mentioned requirements.

However, as the device has only one auxiliary chamber and one orifice providing communication between the main and auxiliary chambers, it is necessary to tune the arrangement for low frequency vibration attenuation and it is therefore difficult to achieve a low dynamic spring constant in relatively high frequency zones. Accordingly, the reduction of the vibration transmission ratio under such conditions is not possible.

Under these conditions, the resonance characteristics of the brackets which support the power unit and drive train are such that, with the increase in the dynamic spring constant, high frequency vibrations tend to be transmitted to the vehicle cabin and induce reverberation noise therein.

SUMMARY OF THE INVENTION

It is an object of the present invention to provide an engine mount which can attenuate vibration transmission in both the low vibration region wherein engine shake and idling vibrations occur, and in a relatively high vibration region wherein vehicle cabin reverberation noise tends to be produced.

In brief, the above objects are achieved by an arrangement wherein an ERF (electrorheopectic fluid) filled engine mount has a main working chamber and first and second auxiliary chambers; an orifice passage structure provides fluid communication between the main and first auxiliary chambers; a first set of electrode plates are disposed in the orifice passage structure in a manner which permits the viscosity of the ERF to be selectively controlled; the first auxiliary chamber exhibits a relatively small expansive spring characteristic; a transfer port provides fluid communication between the main working chamber and the second auxiliary chamber; the second auxiliary chamber exhibits a relatively large expansive spring characteristic and functions to attenuate relatively high frequency vibration; and an on/off type valve means is disposed in the transfer port.

More specifically, the present invention is deemed to comprise an engine mount which features: an elastomeric body; means defining a main working chamber, said main working chamber being in part defined by said elastomeric body; an orifice, said first orifice exhibiting a resonance frequency which falls in a relatively low frequency range; a first set of electrodes, said first set of electrodes being disposed in said first orifice; means defining a first auxiliary chamber, said first auxiliary chamber being fluidly communicated with said main working chamber by way of said first orifice, said first auxiliary chamber exhibiting relatively low expansion spring characteristics, said first auxiliary chamber being defined in part by a first flexible partition member; means defining a second auxiliary chamber, said second auxiliary chamber exhibiting relatively high expansion spring characteristics; said second auxiliary chamber being defined in part by a second flexible partition wall; a transfer passage, said transfer passage providing fluid communication between said main working chamber and said second auxiliary chamber; valve means disposed in said transfer passage, said valve means selectively opening and closing said transfer passage; and control means, said control means being operatively connected with said electrodes and said valve means.

DETAILED DESCRIPTION OF THE PREFERRED EMBODIMENTS

Figure 1:
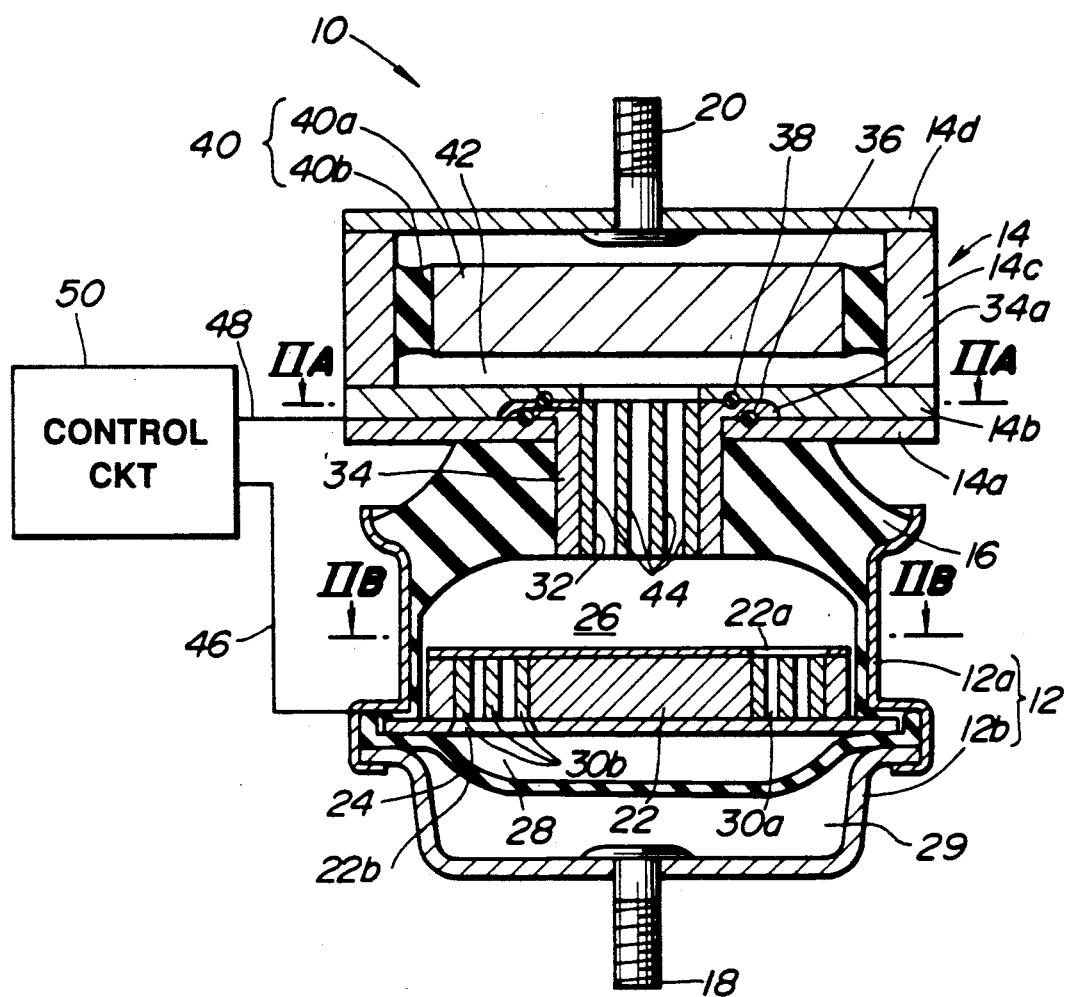
FIG. 1 shows in cross-section a first embodiment of the present invention.
Figure 2:
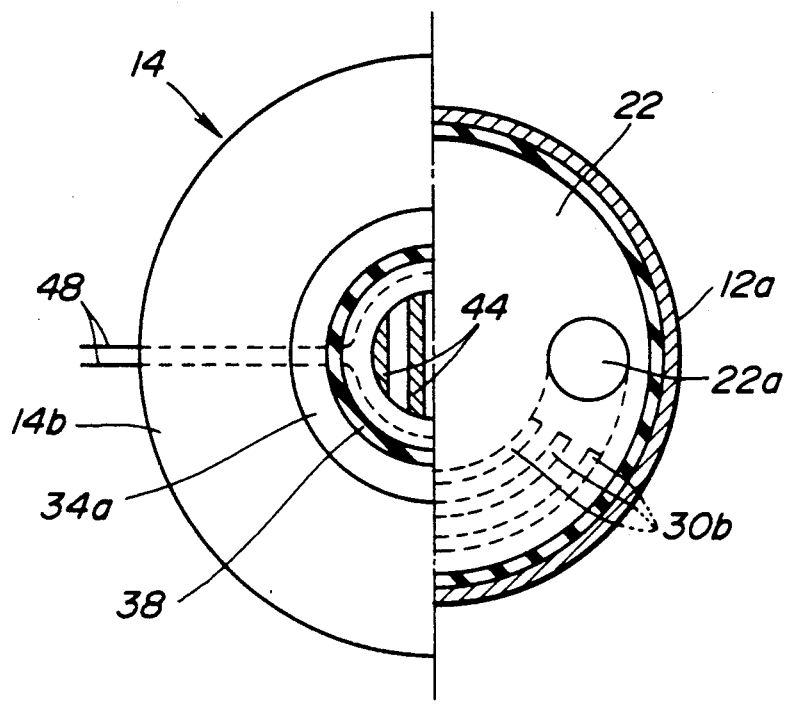
FIG. 2 is a sectional view as taken along section lines IIA—IIA and IIB—IIB of FIG. 1.

FIGS. 1 and 2 show an engine mount 10 according to a first embodiment of the present invention. As shown, this arrangement comprises first and second assemblies 12 and 14 which are respectively connected to the vehicle chassis and the power unit which is supported thereon by the mount 10. An elastomeric body 16 interconnects the two assemblies in the manner illustrated.

The first assembly comprises a cylindrical body 12a which is fixedly connected to a cup-like cover member 12b. The cover member 12b is formed with a connection bolt 18 which is secured to the vehicle chassis via a non-illustrated nut.

The second assembly 14 consists of first and second plates 14a, 14b, an annular member which is fixedly connected to the second plate 14b at its lower end, and a third plate member 14d which is connected to the upper end of the annular member 14c in a manner to define an enclosed space. The third plate 14d is provided with a connection bolt 20 which can be detachably secured to the power unit.

The elastomeric body 16 has an essentially annular configuration which is vulcanized in the mouth of the cylindrical body 12a of the first assembly and to the lower surface of the first plate 14a of the second assembly. In this embodiment the elastomeric body 16 has a cylindrical sleeve which engages the inner wall of the cylindrical body 12a in the manner illustrated.

An orifice plate 22 and a diaphragm 24 are disposed in the first assembly 12 and sandwiched between the two members which define the same. The orifice plate defines a main working chamber 26 between it and the elastomeric body while the diaphragm divides the interior of the cup-shaped cover member 12b into an air chamber and a first auxiliary chamber 28. The orifice plate is formed with an orifice passage structure which fluidly interconnect the main and first auxiliary chambers 26, 28. In this embodiment the passage structure comprises a plurality of orifice passages 30a which are defined between a plurality of arcuate shaped electrode plates 30b.

As best seen in the right hand half of FIG. 2, the instant embodiment includes three electrode plates 30b, two of which are disposed on the inner and outer walls of the curved passage while the third is disposed between first and second. The first and second plates are arranged to have a voltage having a first polarity, impressed thereon while the third is arranged to act as the opposite electrode and on which a voltage having the opposite polarity in impressed.

The diaphragm 24 which is exposed to the pressure prevailing in the first auxiliary chamber is relatively flexible and thus causes the expansive spring characteristics of the chamber 28 to be relatively low. Further, in the instant embodiment the dimensions of the orifice passage structure are selected so that the slug of ERF therein resonates at a relatively low frequency in the order of 35 to 50 Hz which is suited to the attenuation of vibration produced by engine idling.

With the arrangement thus far described, when the elastomeric body 16 undergoes distortion under the influence of vibration which is applied thereto from the second assembly 14, the volume of the main working chamber 26 undergoes a change and the ERF is forced through the orifice passages 30a. When the engine idles, the slugs of ERF in the passages 30a are excited to the point of resonance, and thus consume vibrational energy and the engine mount as a whole exhibits a low dynamic spring constant. Under these conditions the dynamic spring constant of the elastomeric body 16 can also be considered as not having been increased.

A transfer passage or port 32 is arranged to provide fluid communication between the main working chamber 26 and the enclosed space defined in the second assembly 14. In this embodiment the passage comprises a short tube member 34 which communicates with the main working chamber at its lower end, passes through the center of the elastomeric body 16 and is provided with a radially extending flange at its upper end. As shown, the flange is received in a recess formed in the second plate 14b and sandwiched between the first and second plates 14a and 14b.

O rings or similar seal members 36 and 38 are disposed between the upper and lower faces of the flange and the plates which engage the same.

The enclosed spaced is partitioned into a second air chamber (no numeral) and a second auxiliary chamber 42 by a partition member 40. In this instance the partition member 40 is relatively rigid and is comprised of a relatively thick plate 40a and annular elastomeric body 40b which cause the second auxiliary chamber to exhibit relatively high expansive spring characteristics.

The transfer port 32 is so dimensioned that the slug of ERF contained therein exhibits a resonance frequency above 100 Hz and in a region sufficiently high as to coincide with the frequency at which resonance noise in the vehicle cabin tends to be produced.

An ON/OFF type valve arrangement is disposed in the transfer port 32. In the first embodiment this valve takes the form of a plurality (4) of straight electrode plates which extend parallel to one another in the manner shown in FIG. 2. These plates are arranged such that adjacent plates have opposite voltages selectively impressed thereon. When voltages are applied to these plates the ERF exposed thereto undergoes an increase in viscosity to the degree that the transfer port becomes closed.

The innermost and outermost electrode plates 30b and the electrode plates disposed in the transfer port 44 are connected with a control circuit 50 by way of harness 46 and 48.

With the above described arrangement, when vibration which tends to be transmitted from the power unit to the vehicle chassis is produced, the elastomeric body 16 is induced to undergo distortion which tends to pump ERF between the main working chamber 26 and the two auxiliary chambers 28, 42.

When a voltage is not applied to either of the electrode plates 30b or 44, the ERF is transferred through the orifice passages into the first auxiliary chamber 28 and through the transfer port 32 into the second auxiliary chamber 42.

Depending on the mode of operation the control circuit impresses voltages across the electrode plates 30b and 44 in the manner indicated by the following table.

TABLE

|  | ELECTRODES 44 | ELECTRODES 30b |
|---|---|---|
| IDLING | ON | OFF |
| SHAKE | ON | ON |
| OTHER | OFF | OFF |

Figure 3:
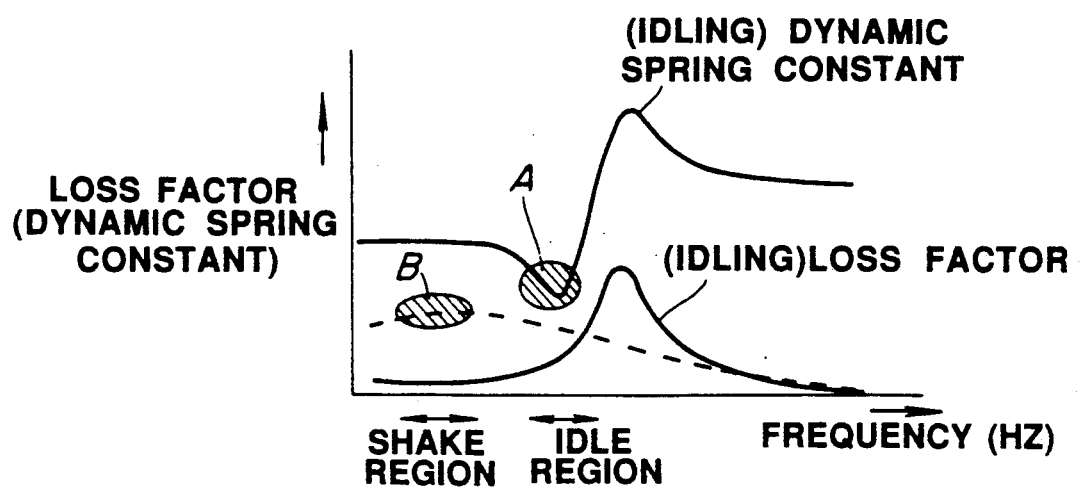
FIG. 3 is a graph which shows the dynamic spring constant and loss characteristics in a relatively low frequency vibration region produced by the first embodiment of the present invention in a relatively low vibration frequency region.

During idling, the electrode plates 44 have a voltage impressed thereon with the result that the viscosity of the ERF in the transfer port 32 is increased with the result that communication between the main working chamber 26 and the second auxiliary chamber 42 is cut-off. Under these conditions communication between the main working chamber 26 and the first auxiliary chamber 28 is permitted via the orifice passages 30a and the fluid contained in the orifice passages is excited to a state of resonance by the vibration applied. The dynamic spring constant of the engine mount 10 is greatly reduced as indicated by the hatched zone A in FIG. 3.

Accordingly, the vibration transmission ratio is notably reduced and the engine mount functions effectively during idling to prevent vibration from being applied to the vehicle chassis.

Next, when car shake occurs (10 Hz region) both sets of electrode plates 30b and 44 have a voltage impressed thereacross. This results in both the transfer port 32 and the orifice passages being effectively closed. Under these conditions the loss factor of the mount is greatly increased as indicated by the hatched section B in FIG. 3 and the transmission of the vibration, which accompanies the relatively large displacement of the power unit, to the vehicle chassis is greatly reduced.

Figure 4:
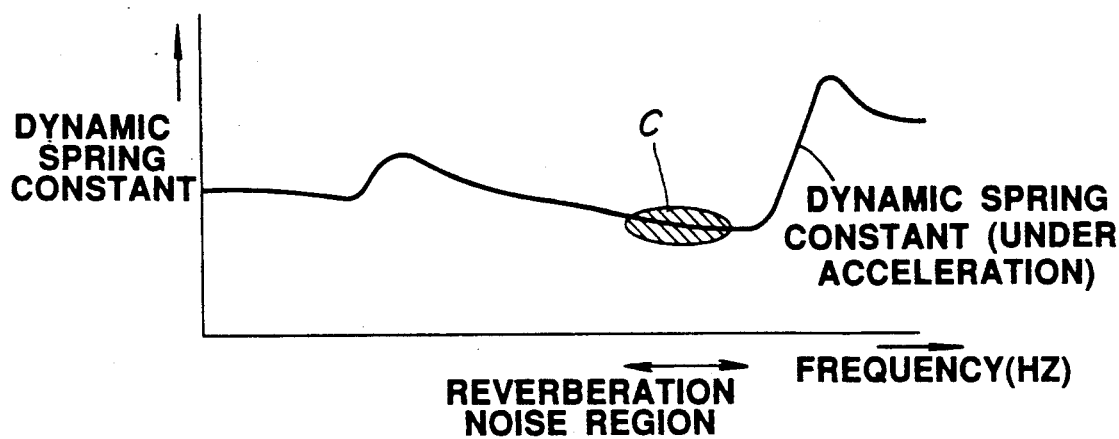
FIG. 4 is a graph which shows the dynamic spring characteristics which are produced by the first embodiment in a relatively high vibration frequency region.

During modes other than idling and shake, neither set of electrode plates has a voltage impressed thereon. As a result, during acceleration when the engine rotational speed is high, the dynamic spring constant of the mount is, as indicated by the hatched zone C in FIG. 4, lowered in the frequency range in which cabin resonance noise inducing vibrations tend to be transmitted between the engine (power unit) and the vehicle chassis.

It should be noted that it is within the scope of the present invention to impress a voltage on the electrode plates 30b (only) during modes other than idling and shake when relatively high frequency vibration is being applied to the mount 10, and thus induce orifice stick in orifice passages interconnecting the main and first auxiliary chambers 26, 28.

It should also be noted that as the partition member 40 is relatively rigid and is comprised of a relatively thick plate 40a and annular elastomeric body 40b it is easy to arrange the construction to exhibit relatively high expansive spring characteristics in the presence of relatively high frequency vibration.

Figure 5:
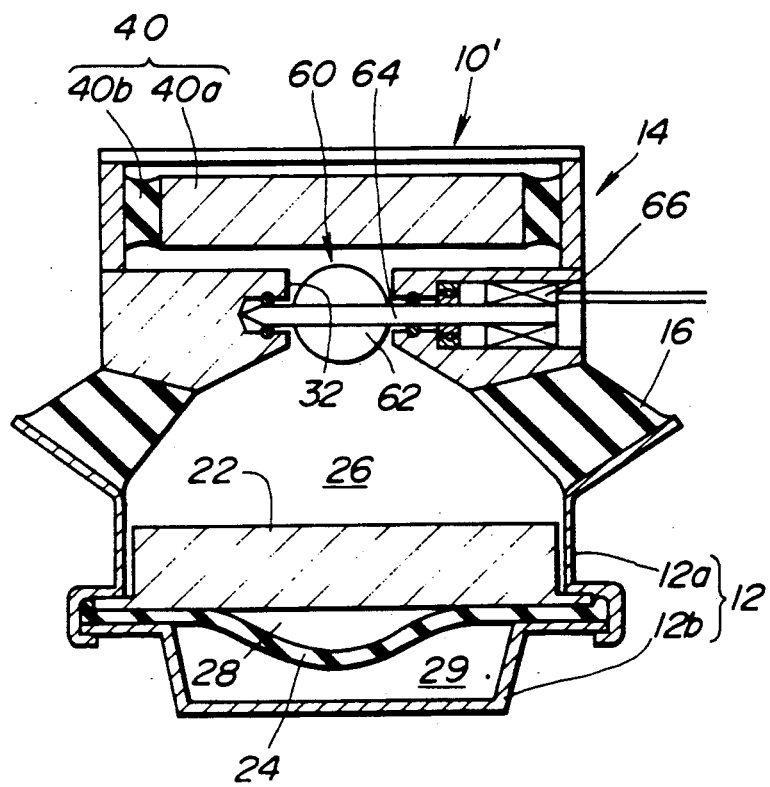
FIG. 5 shows a second embodiment of the present invention.

FIG. 5 shows an engine mount 10' according to a second embodiment of the present invention. This embodiment is generally similar to the first one and differs in that a butterfly type valve 60 is disposed in the transfer port 32 in place of the electrode plates 44. In this instance the valve 60 comprises a valve blade 62 which is disposed on one end of a rotatable shaft 64. The other end of the shaft is operatively connected with a rotary solenoid type motor arrangement 66. This motor arrangement is such that when energized the shaft 64 is rotated to a position wherein the transfer port 32 is closed.

As in the case of the first embodiment, during idling and engine shake, the solenoid is supplied with current in a manner which induces the valve blade 62 to assume a closed position and thus prevent communication between the main and second auxiliary chambers 28, 42.

What is claimed is:

1. An engine mount comprising:
   an elastomeric body;
   means defining a main working chamber, said main working chamber being in part defined by said elastomeric body and filled with an electrorheopectic fluid;
   a first orifice passage structure, said first orifice passage structure exhibiting a resonance frequency which falls in a relatively low frequency range;
   a first set of electrodes, said first set of electrodes being disposed in said first orifice passage structure;
   means defining a first auxiliary chamber, said first auxiliary chamber being fluidly communicated with said main working chamber exclusively by way of said first orifice passage structure, said first auxiliary chamber exhibiting relatively low expansion spring characteristics, said first auxiliary chamber being defined in part by a first flexible partition member;
   means defining a second auxiliary chamber, said second auxiliary chamber exhibiting relatively high expansion spring characteristics, said second auxiliary chamber being defined in part by a second flexible partition member;
   a transfer passage, said transfer passage providing exclusive fluid communication between said main working chamber and said second auxiliary chamber;
   valve means disposed in said transfer passage, said valve means selectively opening and closing said transfer passage; and
   control means, said control means being operatively connected with said electrodes and said valve means, for energizing said first set of electrodes and for conditioning said valve means to close said transfer passage when vibrational energy applied to said mount falls in a first predetermined low vibration range, for de-energizing said first set of electrodes and conditioning said valve means to close said transfer passage when vibration which is applied to said mount falls in a second predetermined intermediate vibration range which is higher than said first predetermined range, and for de-energizing said first set of electrodes and conditioning said valve means to open said transfer passage when vibration applied to said mount falls in a third predetermined high vibration range.

* * * * *